US012180357B2

(12) United States Patent
Nam et al.

(10) Patent No.: US 12,180,357 B2
(45) Date of Patent: Dec. 31, 2024

(54) ABS-BASED RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Jinoh Nam, Daejeon (KR); Seunghun Han, Daejeon (KR); Seong Lyong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 533 days.

(21) Appl. No.: 17/641,306

(22) PCT Filed: Jun. 9, 2021

(86) PCT No.: PCT/KR2021/007209
§ 371 (c)(1),
(2) Date: Mar. 8, 2022

(87) PCT Pub. No.: WO2022/065630
PCT Pub. Date: Mar. 31, 2022

(65) Prior Publication Data
US 2022/0363882 A1 Nov. 17, 2022

(30) Foreign Application Priority Data
Sep. 24, 2020 (KR) ........................ 10-2020-0123587

(51) Int. Cl.
| C08L 25/12 | (2006.01) |
| B29B 9/06 | (2006.01) |
| B29C 45/00 | (2006.01) |
| B29K 55/02 | (2006.01) |
| B29K 105/00 | (2006.01) |

(52) U.S. Cl.
CPC ................ *C08L 25/12* (2013.01); *B29B 9/06* (2013.01); *B29C 45/0001* (2013.01); *B29K 2055/02* (2013.01); *B29K 2105/0032* (2013.01); *C08L 2205/03* (2013.01)

(58) Field of Classification Search
CPC ............ C08L 25/12; B29C 45/00; B29B 9/06
USPC ......................................................... 524/504
See application file for complete search history.

(56) References Cited

U.S. PATENT DOCUMENTS

| 5,599,862 A | 2/1997 | Kohler et al. |
| 2001/0031827 A1 | 10/2001 | Virkler et al. |
| 2010/0048798 A1 | 2/2010 | You et al. |
| 2013/0217817 A1 | 8/2013 | Mochizuki et al. |
| 2016/0185949 A1 | 6/2016 | Mochizuki et al. |
| 2017/0327688 A1 | 11/2017 | Kim et al. |
| 2019/0225788 A1* | 7/2019 | Kim ........................ C08L 35/04 |

FOREIGN PATENT DOCUMENTS

| CN | 1414985 A | 4/2003 |
| CN | 103108915 A | 5/2013 |
| CN | 108864854 A | 11/2018 |
| JP | 51-100145 A | 9/1976 |
| JP | H07-331026 A | 12/1995 |
| JP | H0870999 A | 3/1996 |
| JP | 2001200166 A | 7/2001 |
| JP | 2001-323127 A | 11/2001 |
| JP | 2002020574 A | 1/2002 |
| JP | 2015157950 A | 9/2015 |
| KR | 10-1999-0055610 A | 7/1999 |
| KR | 10-2001-0056186 A | 7/2001 |
| KR | 10-0986798 B1 | 10/2010 |
| KR | 10-1020054 B1 | 3/2011 |
| KR | 10-2011-0079011 A | 7/2011 |
| KR | 20140147285 A | 12/2014 |
| KR | 10-2019-0075350 A | 7/2019 |
| KR | 10-2019-0126313 A | 11/2019 |
| WO | 2012026415 A1 | 3/2012 |
| WO | 2016080675 A1 | 5/2016 |
| WO | 2019020686 A1 | 1/2019 |
| WO | 2020060085 A1 | 3/2020 |

OTHER PUBLICATIONS

First Office Action issued in corresponding Japanese Patent Application No. 2022-520108, dated Feb. 6, 2023.
First Office Action Report dated Sep. 11, 2023, issued in China Patent Application No. 202180005600.5. Note: KR 10-2019-0075350 cited therein is already of record.
First Office Action dated Mar. 8, 2024 from the KIPO corresponding Priority Patent Application No. 10-2020-0123587.
International Search Report and Written Opinion issued in corresponding International Patent Application No. PCT/KR2021/007209, dated Sep. 23, 2021.
Supplementary European Search Report for European Application No. 21 85 6952 dated Oct. 26, 2022, 5 pages.
Second Office Action issued in corresponding European Patent Application No. 21 856 952.3, dated Mar. 6, 2023.

* cited by examiner

*Primary Examiner* — Deve V Hall
(74) *Attorney, Agent, or Firm* — Morgan, Lewis & Bockius LLP

(57) ABSTRACT

Disclosed is an ABS-based resin composition, a method of preparing the same, and a molded article including the same, including an ABS-based resin composition including 100 parts by weight of a base resin including 20 to 40% by weight of a vinyl cyanide compound-conjugated diene compound-aromatic vinyl compound graft copolymer and 60 to 80% by weight of an aromatic vinyl compound-vinyl cyanide compound copolymer; and 0.1 to 5 parts by weight of a polyether-modified polysiloxane, a method of preparing the ABS-based resin composition, and a molded article including the ABS-based resin composition.

14 Claims, No Drawings

ABS-BASED RESIN COMPOSITION, METHOD OF PREPARING THE SAME, AND MOLDED ARTICLE INCLUDING THE SAME

CROSS-REFERENCE TO RELATED APPLICATION

The present application is a U.S. National Stage of PCT/KR2021/007209, filed on Jun. 9, 2021, which claims priority to Korean Patent Application No. 10-2020-0123587, filed on Sep. 24, 2020 in the Korean Intellectual Property Office, the disclosures of each of which are incorporated herein by reference.

TECHNICAL FIELD

The present invention relates to an ABS-based resin composition, a method of preparing the same, and a molded article including the same. More particularly, the present invention relates to an ABS-based resin composition having excellent impact strength, colorability, and gloss by solving a conventional trade-off relationship in which colorability and gloss are poor when impact strength is improved, and impact strength is poor when colorability and gloss are improved; a method of preparing the ABS-based resin composition; and a molded article manufactured using the ABS-based resin composition.

BACKGROUND ART

Vinyl cyanide compound-conjugated diene compound-aromatic vinyl compound graft copolymers represented by acrylonitrile-butadiene-styrene resins (hereinafter referred to as "ABS-based resins") can overcome the disadvantages of conventional high-impact polystyrene (HIPS), such as low heat resistance and rigidity. The vinyl cyanide compound-conjugated diene compound-aromatic vinyl compound graft copolymers have excellent physical properties, such as impact resistance, chemical resistance, thermal stability, colorability, fatigue resistance, rigidity, and processability, in particular, excellent processability. Due to these advantages, ABS-based resins are used in various fields, such as interior/exterior materials for automobiles, office equipment, parts for various electric/electronic products, and materials for toys.

When an ABS-based resin having a higher impact strength than that of a general ABS-based resin is required, an additive such as silicon is added when preparing the ABS-based resin.

However, when an additive, such as silicon, is added to improve the impact strength of an ABS-based resin, impact strength is improved, but colorability and gloss are degraded due to the trade-off relationship between physical properties.

Therefore, it is necessary to develop an ABS-based resin composition having excellent impact strength, colorability, and gloss without deterioration in the intrinsic physical properties of an ABS-based resin.

RELATED ART DOCUMENTS

Patent Documents

Korean Patent No. 2001-0056186

DISCLOSURE

Technical Problem

Therefore, the present invention has been made in view of the above problems, and it is one object of the present invention to provide an ABS-based resin composition having excellent impact strength, colorability, and gloss by solving a conventional trade-off relationship in which colorability and gloss are poor when impact strength is improved, and impact strength is poor when colorability and gloss are improved; a method of preparing the ABS-based resin composition; and a molded article manufactured using the ABS-based resin composition.

The above and other objects can be accomplished by the present invention described below.

Technical Solution

In accordance with one aspect of the present invention, provided is an ABS-based resin composition including 100 parts by weight of a base resin including 20 to 40% by weight of a vinyl cyanide compound-conjugated diene compound-aromatic vinyl compound graft copolymer and 60 to 80% by weight of an aromatic vinyl compound-vinyl cyanide compound copolymer; and 0.1 to 5 parts by weight of a polyether-modified polysiloxane.

The polyether-modified polysiloxane may be a polydialkylsiloxane modified with an alkylene oxide.

The polyether-modified polysiloxane may include one or more selected from the group consisting of a branched polyether-modified polysiloxane, a terminal polyether-modified polysiloxane, and a branched terminal polyether-modified polysiloxane.

The polyether-modified polysiloxane may have a weight average molecular weight of 10,000 to 50,000 g/mol.

The vinyl cyanide compound-conjugated diene compound-aromatic vinyl compound graft copolymer may comprise 40 to 80% by weight of conjugated diene rubber, 10 to 40% by weight of an aromatic vinyl compound, and 1 to 20% by weight of a vinyl cyanide compound.

The aromatic vinyl compound-vinyl cyanide compound copolymer may include 60 to 80% by weight of an aromatic vinyl compound and 20 to 40% by weight of a vinyl cyanide compound.

The aromatic vinyl compound-vinyl cyanide compound copolymer may have a weight average molecular weight of 50,000 to 200,000 g/mol.

The ABS-based resin composition may include 0.1 to 5 parts by weight of an inorganic pigment.

The inorganic pigment may be carbon black.

The ABS-based resin composition may have a color L value of 28.5 or less as measured using a color difference meter (Color-Eye 7000A, SCI mode).

The ABS-based resin composition may have a gloss of 86 or more as measured at 45° using a gloss meter VG7000.

The ABS-based resin composition may have an impact strength of 30 kgf·cm/cm or more as measured using a specimen having a thickness of ⅛" according to ASTM D256.

In accordance with another aspect of the present invention, provided is a method of preparing an ABS-based resin composition, the method including melt-kneading 100 parts by weight of a base resin including 20 to 40% by weight of a vinyl cyanide compound-conjugated diene compound-aromatic vinyl compound graft copolymer and 60 to 80% by weight of an aromatic vinyl compound-vinyl cyanide compound copolymer; and 0.1 to 5 parts by weight of a polyether-modified polysiloxane under conditions of 200 to 250° C. and 100 to 400 rpm, and then performing extrusion.

In accordance with yet another aspect of the present invention, provided is a molded article including the ABS-based resin composition.

Advantageous Effects

The present invention can provide an ABS-based resin composition having excellent impact strength, colorability, and gloss by solving a conventional trade-off relationship in which colorability and gloss are poor when impact strength is improved, and impact strength is poor when colorability and gloss are improved; a method of preparing the ABS-based resin composition; and a molded article manufactured using the ABS-based resin composition.

Best Mode

Hereinafter, an ABS-based resin composition, a method of preparing the same, and a molded article manufactured using the same according to the present invention will be described in detail.

The present inventors confirmed that, when an ABS-based resin and a SAN-based resin were mixed in a predetermined ratio, and a predetermined polyether-modified polysiloxane in a predetermined amount was added to the mixture, impact strength, colorability, and gloss were all improved without suffering the trade-off relationship between impact strength, colorability, and gloss applied to conventional ABS-based resins. Based on these results, the present inventors conducted further studies to complete the present invention.

The ABS-based resin composition of the present invention includes 100 parts by weight of a base resin including 20 to 40% by weight of a vinyl cyanide compound-conjugated diene compound-aromatic vinyl compound graft copolymer and 60 to 80% by weight of an aromatic vinyl compound-vinyl cyanide compound copolymer; and 0.1 to 5 parts by weight of a polyether-modified polysiloxane. In this case, without suffering a conventional trade-off relationship in which colorability and gloss are poor when impact strength is improved, and impact strength is poor when colorability and gloss are improved, all of impact strength, colorability, and gloss may be improved.

Each component constituting the ABS-based resin composition of the present invention will be described in detail as follows.

Vinyl Cyanide Compound-Conjugated Diene Compound-Aromatic Vinyl Compound Graft Copolymer For example, the vinyl cyanide compound-conjugated diene compound-aromatic vinyl compound graft copolymer of the present invention may be included in a base resin in an amount of 20 to 40% by weight, preferably 20 to 35% by weight, more preferably 20 to 30% by weight, still more preferably 23 to 27% by weight. Within this range, mechanical strength, fluidity, and physical property balance may be excellent.

The vinyl cyanide compound-conjugated diene compound-aromatic vinyl compound graft copolymer is preferably a graft copolymer prepared by graft-polymerizing 40 to 80% by weight of conjugated diene rubber, 10 to 40% by weight of an aromatic vinyl compound, and 1 to 20% by weight of a vinyl cyanide compound. In this case, impact resistance may be excellent.

More preferably, the vinyl cyanide compound-conjugated diene compound-aromatic vinyl compound graft copolymer is a graft copolymer prepared by graft-polymerizing 45 to 70% by weight of conjugated diene rubber, 20 to 40% by weight of an aromatic vinyl compound, and 5 to 20% by weight of a vinyl cyanide compound. In this case, impact resistance may be excellent.

Still more preferably, the vinyl cyanide compound-conjugated diene compound-aromatic vinyl compound graft copolymer is a graft copolymer prepared by graft-polymerizing 50 to 65% by weight of conjugated diene rubber, 20 to 35% by weight of an aromatic vinyl compound, and 5 to 15% by weight of a vinyl cyanide compound. In this case, impact resistance may be excellent.

The conjugated diene rubber preferably has an average particle diameter of 50 to 500 nm, more preferably 100 to 500 nm, still more preferably 150 to 400 nm, still more preferably 200 to 350 nm, most preferably 250 to 320 nm. Within this range, the mechanical properties and physical properties, such as colorability, of the ABS-based resin composition may be excellent.

In this specification, the average particle diameter of conjugated diene rubber may be measured as an intensity value using a Nicomp 370HPL (Nicomp Co., USA) in a Gaussian mode according to a dynamic laser light scattering method. As a specific measurement example, a sample is prepared by diluting 0.1 g of latex (TSC: 35 to 50 wt %) 1,000 to 5,000 times with distilled water, i.e., a sample is diluted appropriately so as not to deviate significantly from an intensity setpoint of 300 kHz and is placed in a glass tube. Then, the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

For example, the conjugated diene compound may include one or more selected from the group consisting of 1,3-butadiene, 2,3-dimethyl-1,3-butadiene, 2-ethyl-1,3-butadiene, 1,3-pentadiene, isoprene, chloroprene, and pyrerylene.

For example, the aromatic vinyl compound may include one or more selected from the group consisting of styrene, α-methylstyrene, p-methylstyrene, o-ethylstyrene, p-ethylstyrene, and vinyltoluene.

For example, the vinyl cyanide compound may include one or more selected from the group consisting of acrylonitrile, methacrylonitrile, ethacrylonitrile, and derivatives thereof.

As a preferred example, the conjugated diene rubber may include one or more of butadiene polymers, butadiene-styrene copolymers, butadiene-acrylonitrile copolymers, ethylene-propylene copolymers, and polymers derived therefrom, without being limited thereto.

In this specification, the derived polymer means a polymer prepared by copolymerizing another monomer or polymer not included in an original copolymer, or a polymer prepared by copolymerizing a derivative of the monomer.

In this specification, the derivative is a compound produced by substituting a hydrogen atom or hydrogen atom group of an original compound with another atom or atom group, for example, refers to a compound produced by substitution with a halogen or an alkyl group.

For example, the vinyl cyanide compound-conjugated diene compound-aromatic vinyl compound graft copolymer may be prepared by a known polymerization method such as emulsion polymerization, suspension polymerization, or bulk polymerization, preferably emulsion polymerization.

A method of preparing the vinyl cyanide compound-conjugated diene compound-aromatic vinyl compound graft copolymer by emulsion polymerization preferably includes a step of adding, continuously or batchwise, a monomer mixture containing 1 to 20% by weight of a vinyl cyanide compound and 10 to 40% by weight of an aromatic vinyl compound to a mixed solution containing 40 to 80% by weight of conjugated diene rubber, 0.1 to 5 parts by weight of an emulsifier, 0.1 to 3 parts by weight of a molecular weight modifier, and 0.05 to 1 part by weight of a polymerization initiator based on 100 parts by weight in total of the conjugated diene rubber, the aromatic vinyl compound, and the vinyl cyanide compound included in the graft copolymer, and performing polymerization.

For example, the emulsifier may include one or more selected from the group consisting of allyl aryl sulfonates, alkali methyl alkyl sulfonates, sulfonated alkyl esters, fatty acid soap, and rosin acid alkali salts. In this case, polymerization stability may be excellent.

For example, the molecular weight modifier may include one or more selected from the group consisting of t-dodecyl mercaptan, n-dodecyl mercaptan, n-octyl mercaptan, and carbon tetrachloride, preferably t-dodecyl mercaptan.

For example, the polymerization initiator may include one or more selected from the group consisting of potassium persulfate, sodium persulfate, and ammonium persulfate. In this case, polymerization efficiency and the physical properties of a polymer to be prepared may be excellent.

For example, latex prepared by emulsion polymerization may be coagulated using a coagulant such as sulfuric acid, $MgSO_4$, $CaCl_2$, or $Al_2(SO_4)_3$, and then the coagulated latex may be aged, dehydrated, and dried to obtain powdered latex.

Methods of preparing the vinyl cyanide compound-conjugated diene compound-aromatic vinyl compound graft copolymer are not particularly limited when using conditions, methods, and devices commonly used in the art to which the present invention pertains according to the definition of the present invention.

Aromatic Vinyl Compound-Vinyl Cyanide Compound Copolymer

For example, the aromatic vinyl compound-vinyl cyanide compound copolymer of the present invention may be included in the base resin in an amount of 60 to 80% by weight, preferably 65 to 80% by weight, more preferably 70 to 80% by weight, still more preferably 73 to 77% by weight. Within this range, mechanical strength, fluidity, and physical property balance may be excellent.

In this specification, the aromatic vinyl compound-vinyl cyanide compound copolymer may be an aromatic vinyl compound-vinyl cyanide compound copolymer (SAN-based resin) commonly used in the art to which the present invention pertains, without particular limitation, and preferably includes 60 to 80% by weight of an aromatic vinyl compound and 20 to 40% by weight of a vinyl cyanide compound. In this case, the fluidity of the ABS-based resin composition may be improved, thereby improving processability and productivity.

As another example, the aromatic vinyl compound-vinyl cyanide compound copolymer may include 70 to 80% by weight of an aromatic vinyl compound and 20 to 30% by weight of a vinyl cyanide compound. In this case, processability and productivity of the ABS-based resin composition may be excellent, and mechanical properties, such as impact strength, heat resistance, and colorability may be excellent.

As another example, the aromatic vinyl compound-vinyl cyanide compound copolymer may include 70 to 75% by weight of an aromatic vinyl compound and 25 to 30% by weight of a vinyl cyanide compound. In this case, processability and productivity of the ABS-based resin composition may be excellent, and mechanical properties, such as impact strength, heat resistance, and colorability may be excellent.

For example, the aromatic vinyl compound-vinyl cyanide compound copolymer may be prepared by bulk polymerization or emulsion polymerization. In terms of manufacturing cost, bulk polymerization is preferably used.

The aromatic vinyl compound-vinyl cyanide compound copolymer preferably has a weight average molecular weight of 50,000 to 200,000 g/mol, more preferably 80,000 to 180,000 g/mol, still more preferably 100,000 to 150,000 g/mol, still more preferably 120,000 to 150,000 g/mol. Within this range, desired fluidity may be obtained, and processability, productivity, and colorability may be excellent.

Weight average molecular weight may be measured by gel permeation chromatography (GPC). As a specific example, weight average molecular weight may be obtained as a relative value to a polystyrene standard as measured by GPC.

In this specification, weight average molecular weight may be measured using tetrahydrofuran (THF) as an eluate through gel permeation chromatography (GPC, Waters Breeze). In this case, weight average molecular weight is obtained as a relative value to a polystyrene standard (PS) specimen. Specific measurement conditions are as follows: solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

Methods of preparing the aromatic vinyl compound-vinyl cyanide compound copolymer are not particularly limited when using conditions, methods, and devices commonly used in the art to which the present invention pertains according to the definition of the present invention.

Polyether-Modified Polysiloxane

For example, based on 100 parts by weight of the base resin, the polyether-modified polysiloxane of the present invention may be included in an amount of 0.1 to 5 parts by weight, preferably 0.2 to 3 parts by weight, more preferably 0.3 to 3 parts by weight, still more preferably 0.4 to 2.5 parts by weight, still more preferably 0.5 to 2.5 parts by weight, still more preferably 1 to 2.5 parts by weight, still more preferably 1.5 to 2.5 parts by weight. Within this range, all of impact strength, colorability, and gloss may be excellent, and especially, chemical resistance may be excellent.

The polyether-modified polysiloxane is preferably a polysiloxane modified with an alkylene oxide, such as ethylene oxide, propylene oxide, butylene oxide, or tetramethylene oxide, more preferably a polydialkyl siloxane modified with ethylene oxide and/or propylene oxide. In this case, all of impact strength, colorability, and gloss may be excellent.

The polyether-modified polysiloxane preferably includes one or more selected from the group consisting of polydimethyl siloxane, polydiethyl siloxane, polydipropyl siloxane, polydibutyl siloxane, and polydipentyl siloxane. In this case, all of impact strength, colorability, and gloss may be excellent.

The polyether-modified polysiloxane preferably includes one or more selected from the group consisting of a branched polyether-modified polysiloxane, a terminal polyether-modified polysiloxane, and a branched terminal polyether-modified polysiloxane, more preferably one or more selected from the group consisting of a branched polyether-modified polydialkyl siloxane, a terminal polyether-modified polydialkyl siloxane, and a branched terminal polyether-modified polydialkyl siloxane. In this case, all of impact strength, colorability, and gloss may be excellent.

The branched polyether modification means that a polyether residue is bonded to a side chain with respect to the main chain of a polysiloxane, the terminal polyether modification means that a polyether residue is bonded to a chain end, and the branched terminal polyether modification means that a polyether residue is bonded to both of a side chain and a chain end.

More preferably, the branched polyether-modified polydialkyl siloxane is a polymer represented by Chemical Formula 1 below. In this case, all of impact strength, colorability, and gloss may be excellent.

[Chemical Formula 1]

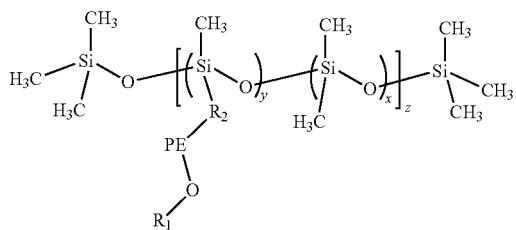

In Chemical Formula 1, PE represents a polyether residue; $R_1$ represents an alkyl group; $R_2$ represents an alkylene group; and x, y, and z are arbitrary numbers, specifically, integers of 50 to 1,000.

In this specification, the alkyl group may be an alkyl group having 1 to 20 carbon atoms, preferably an alkyl group having 1 to 16 carbon atoms, more preferably an alkyl group having 1 to 12 carbon atoms, still more preferably an alkyl group having 1 to 8 carbon atoms, still more preferably an alkyl group having 1 to 4 carbon atoms.

For example, the alkyl group may be a linear, branched, or cyclic alkyl group.

As a specific example, the alkyl group may include one or more selected from the group consisting of a methyl group, an ethyl group, an n-propyl group, an isopropyl group, an n-butyl group, an isobutyl group, a sec-butyl group, a t-butyl group, an n-pentyl group, an isopentyl group, a neopentyl group, an n-hexyl group, an n-heptyl group, an n-octyl group, a cyclobutyl group, a cyclopentyl group, a cyclohexyl group, and a cycloheptyl group.

In addition, the alkyl group may be optionally substituted with one or more substituents.

In this specification, for example, the alkylene group may be an alkylene group having 1 to 20 carbon atoms, preferably an alkylene group having 1 to 16 carbon atoms, more preferably an alkylene group having 1 to 12 carbon atoms, still more preferably an alkylene group having 1 to 8 carbon atoms, still more preferably an alkylene group having 1 to 4 carbon atoms.

For example, the alkylene group may be a linear, branched, or cyclic alkylene group.

In addition, the alkylene group be optionally substituted with one or more substituents.

For example, the substituent substituted for the alkyl group or the alkylene group may be an alkyl group, an alkoxy group, an alkenyl group, an epoxy group, a cyano group, a thiol group, a carboxyl group, an acryloyl group, a methacryloyl group, an acryloyloxy group, a methacryloyloxy group, or an aryl group, without being limited thereto.

The polyether-modified polysiloxane preferably has a surface tension of 15 to 30 mN/m. Within this range, all of impact strength, colorability, and gloss may be excellent.

In this specification, surface tension measurement methods commonly used in the art to which the present invention pertains may be used in the present invention without particular limitation. As a specific example, a droplet method may be used to measure surface tension.

The polyether-modified polysiloxane preferably has a weight average molecular weight of 10,000 to 50,000 g/mol, more preferably 20,000 to 35,000 g/mol. Within this range, all of impact strength, colorability, and gloss may be excellent.

The weight average molecular weight may be measured using gel permeation chromatography (GPC). In this case, weight average molecular weight is obtained as a relative value to a polystyrene standard.

Methods of preparing the polyether-modified polysiloxane are not particularly limited when using conditions, methods, and devices commonly used in the art to which the present invention pertains according to the definition of the present invention.

Inorganic Pigment

The inorganic pigment of the present invention is preferably carbon black, titanium dioxide ($TiO_2$), or a mixture thereof. In this case, mechanical properties may be maintained, colorability may be excellent, and degree of discoloration may be reduced.

The carbon black preferably includes one or more selected from the group consisting of ketjen black, acetylene black, furnace black, and channel black. In this case, mechanical properties may be maintained, colorability may be excellent, and degree of discoloration may be reduced.

The carbon black is preferably a master batch mixed with an aromatic vinyl compound-vinyl cyanide compound copolymer. In this case, mechanical properties may be maintained, colorability may be excellent, and degree of discoloration may be reduced.

The carbon black master batch preferably includes 30 to 70% by weight of an aromatic vinyl compound-vinyl cyanide compound copolymer and 30 to 70% by weight of carbon black, more preferably 50 to 70% by weight of an aromatic vinyl compound-vinyl cyanide compound copolymer and 30 to 50% by weight of carbon black. Within this range, mechanical properties may be maintained, colorability may be excellent, and degree of discoloration may be reduced.

Based on 100 parts by weight of the base resin, the inorganic pigment is preferably included in an amount of 0.1 to 5 parts by weight, more preferably 0.5 to 3 parts by weight, still more preferably 0.5 to 2 parts by weight, still more preferably 0.5 to 1.5 parts by weight. Within this range, mechanical properties may be maintained, colorability may be excellent, and degree of discoloration may be reduced.

ABS-Based Resin Composition

The ABS-based resin composition of the present invention preferably has a melt index (MFR) of 15 to 25 g/10 min, more preferably 18 to 25 g/10 min, still more preferably 18 to 23 g/10 min as measured under conditions of 220° C. and 10 kg. Within this range, processability and physical property balance may be excellent.

The ABS-based resin composition preferably has a color L value of 28.5 or less, more preferably 28 or less, still more preferably 27.5 or less as measured using a color difference meter (Color-Eye 7000A, SCI mode). Within this range, colorability and physical property balance may be excellent.

The ABS-based resin composition preferably has a gloss of 86 or more, more preferably 87 or more, still more preferably 88 or more as measured at 45° using a gloss meter VG7000. Within this range, gloss and physical property balance may be excellent.

When a specimen having a size of 200 mm×12.7 mm×3.2 mm is fixed to a curved jig having a strain of 1.1%, 1 cc of thinner is applied thereto, and then time at which cracks occur in the specimen is measured, the ABS-based resin composition preferably has a chemical resistance of 400 seconds or more, more preferably 450 seconds or more, still more preferably 480 seconds or more, still more preferably 500 seconds or more, still more preferably 550 seconds or more, most preferably 600 seconds or more. Within this range, chemical resistance and physical property balance may be excellent.

The ABS-based resin composition preferably has an impact strength of 30 kgf·cm/cm or more, more preferably 32 kgf·cm/cm or more, still more preferably 33 kgf·cm/cm or more, as a preferred example, 30 to 35 kgf·cm/cm, as a more preferred example, 32 to 35 kgf·cm/cm, as a still more preferred example, 33 to 35 kgf·cm/cm as measured using a specimen having a thickness of ⅛" according to ASTM D256. Within this range, impact strength and physical property balance may be excellent.

When necessary, based on 100 parts by weight of the base resin, the ABS-based resin composition may include 0.5 to 5 parts by weight, preferably 1 to 4 parts by weight, more preferably 1.5 to 3 parts by weight of one or more selected from the group consisting of lubricants, flame retardants, heat stabilizers, antioxidants, light stabilizers, compatibilizers, pigments (however, inorganic pigments are excluded), dyes, and inorganic additives. Within this range, the intrinsic effect of the additives may be efficiently expressed without impairing the desired effect of the present invention.

For example, the lubricants may include one or more selected from the group consisting of wax, silicone oil, and stearamide.

For example, the silicone oil may include one or more selected from the group consisting of dimethyl silicone oil, methyl hydrogen silicone oil, hydroxy silicone oil, carbinol-modified silicone oil, vinyl silicone oil, and silicone acrylate.

For example, the heat stabilizers may include one or more selected from the group consisting of tris(nonylphenyl) phosphite, tris(2,4-di-t-butylphenyl) phosphite (TBPP), 2,4,6-tri-t-butylphenyl-2-butyl-2-ethyl-1,3-propanediol phosphite, diisodecyl pentaerythritol diphosphite, distearyl pentaerythritol diphosphite, bis(2,4-di-t-butylphenyl) pentaerythritol diphosphite (PEP24), bis(2,4-di-cumylphenyl) pentaerythritol diphosphite, and tetrakis(2,4-di-t-butylphenyl)[1,1-biphenyl]-4,4'-diyl bisphosphonate.

For example, the antioxidants may include hindered phenolic antioxidants, phosphide antioxidants, or mixtures thereof.

Method of Preparing ABS-Based Resin Composition

A method of preparing the ABS-based resin composition of the present invention preferably includes a step of melt-kneading 100 parts by weight of a base resin including 20 to 40% by weight of a vinyl cyanide compound-conjugated diene compound-aromatic vinyl compound graft copolymer and 60 to 80% by weight of an aromatic vinyl compound-vinyl cyanide compound copolymer; and 0.1 to 5 parts by weight of a polyether-modified polysiloxane under conditions of 200 to 250° C. and 100 to 400 rpm, and then performing extrusion. In this case, there is an advantage of providing an ABS-based resin composition having excellent impact strength, colorability, and gloss without suffering a conventional trade-off relationship in which colorability and gloss are poor when impact strength is improved, and impact strength is poor when colorability and gloss are improved.

The step of performing melt-kneading and extrusion is preferably performed at 210 to 250° C. and 200 to 350 rpm, more preferably at 210 to 240° C. and 250 to 350 rpm. Within this range, the desired effect of the present invention may be well expressed.

For example, when performing melt-kneading, based on 100 parts by weight of the base resin, 0.1 to 5 parts by weight, preferably 0.3 to 4 parts by weight, more preferably 0.5 to 3 parts by weight of one or more selected from the group consisting of lubricants, flame retardants, heat stabilizers, anti-dripping agents, antioxidants, light stabilizers, compatibilizers, pigments (however, inorganic pigments are excluded), dyes, and inorganic additives may be further included. Within this range, the intrinsic effect of the additives may be efficiently expressed without impairing the desired effect of the present invention.

An extrusion product obtained by the melt-kneading and extrusion step is preferably pellets.

The vinyl cyanide compound-conjugated diene compound-aromatic vinyl compound graft copolymer, the aromatic vinyl compound-vinyl cyanide compound copolymer, the polyether-modified polysiloxane, and the inorganic pigment included in the ABS-based resin composition are the same as those described above, and thus repeated description thereof will be omitted.

Molded Article

The molded article of the present invention includes the ABS-based resin composition. In this case, there is an advantage of providing a molded article having excellent impact strength, colorability, and gloss without suffering a conventional trade-off relationship in which colorability and gloss are poor when impact strength is improved, and impact strength is poor when colorability and gloss are improved.

The molded article is preferably an injection-molded article, more preferably an automobile interior or exterior material or a home appliance exterior material. In this case, a product that satisfies required physical properties may be manufactured.

The molded article is preferably manufactured by including a step of injection-molding the ABS-based resin composition of the present invention or pellets thereof. In this case, injection molding is preferably performed at an injection temperature of 210 to 250° C., more preferably 215 to 240° C., still more preferably 220 to 230° C. and at an injection speed of 7 to 13 mm/sec, more preferably 75 to 85 mm/sec. Within this range, the desired effect of the present invention may be well expressed.

Methods of manufacturing the molded article are not particularly limited when using conditions, methods, and devices commonly used in the art to which the present invention pertains according to the definition of the present invention.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Components used in Examples and Comparative Examples below are as follows:
(A) Vinyl cyanide compound-conjugated diene compound-aromatic vinyl compound graft copolymer by emulsion polymerization: DP270 (LG Chemical Co.) including 60% by weight of a butadiene polymer having an average particle diameter of 300 nm, 10% by weight of acrylonitrile, and 30% by weight of styrene was used.
(B) Aromatic vinyl compound-vinyl cyanide compound copolymer: 92HR (LG Chemical Co.) having a weight average molecular weight of 130,000 g/mol including 27% by weight of acrylonitrile was used.
(C-1) Polyether-modified polysiloxane: Polyether-modified polydimethylsiloxane (BYK-333) was used.
(C-2) Polyether-modified polysiloxane: Polyether-modified polydimethylsiloxane (BYK-378) was used.
(C-3) Unmodified polysiloxane: Polydimethylsiloxane (KF-96-100cs, Shin-Etsu Silicone Co.) was used.
(D) Inorganic pigment: Carbon black master batch (product name: BK50, Muil Hwasung Co.) was used.

perature of 60° C., and an injection speed of 30 mm/sec to prepare a specimen for measuring physical properties.

Test Examples

The properties of the specimens prepared in Examples 1 to 4 and Comparative Examples 1 to 3 were measured according to the following methods, and the results are shown in Table 1 below.
Izod impact strength (kgf·cm/cm): Izod impact strength was measured using a specimen having a thickness of ¼" according to ASTM D256.
Fluidity (g/10 min): Melt viscosity was measured under conditions of 220° C. and 10 kg according to ASTM D256.
Gloss: Gloss was measured at 45° using a gloss meter VG7000 (⅛ inch injection gloss).
Color L: The color L, a, and b values of a specimen were measured using a color difference meter (Color-Eye 7000A, SCI mode). For reference, the color "L" value is a numerical value indicating brightness. As the color "L" value decreases, the degree of blackness increases. The color "a" value is a numerical value indicating the degree of red and green. As the color "a" value decreases, the degree of green increases. The color "b" is a numerical value indicating the degree of yellow and blue. As the color "b" value decreases, the degree of blue increases.
Chemical resistance (ESCR, seconds): A specimen having a size of 200 mm×12.7 mm×3.2 mm was fixed to a curved jig having a strain of 1.1%, 1 cc of thinner was applied thereto, and then time at which cracks occurred in the specimen was measured. When cracks did not occur until 600 seconds, the specimen was evaluated to have good chemical resistance. Specimens that satisfy the chemical resistance evaluation are indicated as >600.

TABLE 1

| (Parts by weight) | | Example 1 | Example 2 | Example 3 | Example 4 | Comparative Example 1 | Comparative Example 2 | Comparative Example 3 |
|---|---|---|---|---|---|---|---|---|
| A | | 25 | 25 | 25 | 25 | 25 | 25 | 25 |
| B | | 75 | 75 | 75 | 75 | 75 | 75 | 75 |
| C-1 | | 0.5 | 2 | | | | | |
| C-2 | | | | 0.5 | 2 | | | |
| C-3 | | | | | | | 0.5 | 2 |
| D | | 1 | 1 | 1 | 1 | 1 | 1 | 1 |
| Impact strength | | 34.3 | 33.4 | 30.4 | 34.1 | 27.6 | 28.0 | 28.0 |
| Melt viscosity | | 18.8 | 21.8 | 19.8 | 22.1 | 19.0 | 19.2 | 21.5 |
| Gloss | | 88.2 | 86.9 | 88.7 | 88.1 | 87.4 | 86.1 | 82.4 |
| Color | L | 27.47 | 28.15 | 27.41 | 27.89 | 27.32 | 28.11 | 29.41 |
| | a | 0.00 | −0.08 | −0.03 | −0.06 | −0.01 | −0.09 | 0.20 |
| | b | −0.93 | −1.14 | −0.92 | −1.15 | −0.93 | −0.73 | −0.13 |
| ESCR (second) | 1 | >600 | >600 | 480 | >600 | 245 | 458 | >600 |
| | 2 | 571 | >600 | 522 | >600 | 227 | 428 | 574 |
| | 3 | 559 | >600 | 411 | >600 | 247 | 510 | 544 |

Examples 1 to 4 and Comparative Examples 1 to 3

According to the contents shown in Table 1, the components shown in Table 1 were introduced into a twin-screw extruder, and melt-kneading and extrusion were performed at 220° C. and 600 rpm to prepare ABS-based resin composition pellets. In addition, the ABS-based resin composition pellets were dried at 80° C. for 3 hours, and then were injection-molded using an injection machine under conditions of an injection temperature of 220° C., a mold tem- As shown in Table 1, compared to the ABS-based resin compositions (Comparative Examples 1 to 3) not including the polyether-modified polysiloxane according to the present invention or including the polyether-modified polysiloxane according to the present invention outside the content range of the present invention, in the case of the ABS-based resin compositions (Examples 1 to 4) according to the present invention, fluidity is maintained within a range that allows for easy processing, and all of impact strength, gloss, and colorability are excellent.

In summary, as in the conventional method, when polydimethylsiloxane is mixed as in Comparative Examples 2 and 3 to improve impact strength in the ABS-based resin composition of Comparative Example 1, a trade-off relationship in which impact strength is improved, but colorability and gloss are poor is observed. However, as in Examples 1 to 4, when the polyether-modified polysiloxane according to the present invention is mixed in a predetermined amount, the trade-off relationship disappears, and impact strength, colorability, and gloss are improved at the same time.

The invention claimed is:

1. An ABS-based resin composition comprising:
   100 parts by weight of a base resin comprising 20 to 40% by weight of a vinyl cyanide compound-conjugated diene compound-aromatic vinyl compound graft copolymer and 60 to 80% by weight of an aromatic vinyl compound-vinyl cyanide compound copolymer; and
   0.1 to 5 parts by weight of a polyether-modified polysiloxane.

2. The ABS-based resin composition according to claim 1, wherein the polyether-modified polysiloxane is a polydialkylsiloxane modified with an alkylene oxide.

3. The ABS-based resin composition according to claim 1, wherein the polyether-modified polysiloxane comprises one or more selected from the group consisting of a branched polyether-modified polysiloxane, a terminal polyether-modified polysiloxane, and a branched terminal polyether-modified polysiloxane.

4. The ABS-based resin composition according to claim 1, wherein the polyether-modified polysiloxane has a weight average molecular weight of 10,000 to 50,000 g/mol.

5. The ABS-based resin composition according to claim 1, wherein the vinyl cyanide compound-conjugated diene compound-aromatic vinyl compound graft copolymer comprises 40 to 80% by weight of conjugated diene rubber, 10 to 40% by weight of an aromatic vinyl compound, and 1 to 20% by weight of a vinyl cyanide compound.

6. The ABS-based resin composition according to claim 1, wherein the aromatic vinyl compound-vinyl cyanide compound copolymer comprises 60 to 80% by weight of an aromatic vinyl compound and 20 to 40% by weight of a vinyl cyanide compound.

7. The ABS-based resin composition according to claim 1, wherein the aromatic vinyl compound-vinyl cyanide compound copolymer has a weight average molecular weight of 50,000 to 200,000 g/mol.

8. The ABS-based resin composition according to claim 1, wherein the ABS-based resin composition comprises 0.1 to 5 parts by weight of an inorganic pigment.

9. The ABS-based resin com position according to claim 8, wherein the inorganic pigment is carbon black.

10. The ABS-based resin composition according to claim 1, wherein the ABS-based resin composition has a color L value of 28.5 or less as measured using a color difference meter.

11. The ABS-based resin composition according to claim 1, wherein the ABS-based resin composition has a gloss of 86 or more as measured at 45° using a gloss meter VG7000.

12. The ABS-based resin composition according to claim 1, wherein the ABS-based resin composition has an impact strength of 30 kgf cm/cm or more as measured using a specimen comprising the ABS-based resin composition and having a thickness of ⅛" according to ASTM D256.

13. A method of preparing an ABS-based resin composition, comprising:
   melt-kneading 100 parts by weight of a base resin comprising 20 to 40% by weight of a vinyl cyanide compound-conjugated diene compound-aromatic vinyl compound graft copolymer and 60 to 80% by weight of an aromatic vinyl compound-vinyl cyanide compound copolymer; and 0.1 to 5 parts by weight of a polyether-modified polysiloxane under conditions of 200 to 250° C. and 100 to 400 rpm, and then performing extrusion.

14. A molded article, comprising the ABS-based resin composition according to claim 1.

* * * * *